US010649616B2

(12) United States Patent
Moore et al.

(10) Patent No.: US 10,649,616 B2
(45) Date of Patent: May 12, 2020

(54) VOLUMETRIC MULTI-SELECTION INTERFACE FOR SELECTING MULTIPLE OBJECTS IN 3D SPACE

(71) Applicant: GOOGLE LLC, Mountain View, CA (US)

(72) Inventors: Evan Moore, Brooklyn, NY (US); Christopher Ross, New York, NY (US); Ian MacGillivray, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/028,239

(22) Filed: Jul. 5, 2018

(65) Prior Publication Data

US 2019/0012060 A1  Jan. 10, 2019

Related U.S. Application Data

(60) Provisional application No. 62/529,221, filed on Jul. 6, 2017.

(51) Int. Cl.
| | | |
|---|---|---|
| *G06F 3/0481* | (2013.01) | |
| *G06F 3/0482* | (2013.01) | |
| *G06F 3/01* | (2006.01) | |
| *G06F 3/0484* | (2013.01) | |
| *G06F 3/0488* | (2013.01) | |
| *G06T 19/00* | (2011.01) | |

(52) U.S. Cl.
CPC .......... *G06F 3/04815* (2013.01); *G06F 3/017* (2013.01); *G06F 3/0482* (2013.01); *G06F 3/0488* (2013.01); *G06F 3/04845* (2013.01); *G06F 3/04883* (2013.01); *G06T 19/006* (2013.01)

(58) Field of Classification Search
CPC ...... G06F 3/0482; G06F 3/017; G06T 19/006
See application file for complete search history.

(56) References Cited

U.S. PATENT DOCUMENTS

| | | | |
|---|---|---|---|
| 6,556,206 B1 * | 4/2003 | Benson | ................... G06T 15/20 345/427 |
| 6,993,461 B1 | 1/2006 | Boussac et al. | |
| 2009/0055136 A1 | 2/2009 | Ilies | |
| 2009/0217209 A1 | 8/2009 | Chen et al. | |

(Continued)

OTHER PUBLICATIONS

International Search Report and Written Opinion for International Application No. PCT/US2018/040959, dated Oct. 16, 2018, 12 pages.

*Primary Examiner* — Eric J. Bycer
(74) *Attorney, Agent, or Firm* — Brake Hughes Bellermann LLP

(57) ABSTRACT

Systems and methods for a volumetric multi-selection interface for selecting multiple entities in three-dimensional (3D) space are provided. An example method includes generating a selection region within a three-dimensional space and receiving a selection path user input to define a selection path. The method also includes defining a selection volume based on the selection region and the selection path and selecting entities within the 3D space based on the selection volume. In some implementations, an alter selection region user input is received while the selection path is being defined. The size or shape of the selection region may be altered in response thereto.

20 Claims, 13 Drawing Sheets

(56) References Cited

U.S. PATENT DOCUMENTS

2012/0216150 A1    8/2012   Wernecke
2015/0331576 A1    11/2015   Vinayak et al.
2017/0270711 A1*   9/2017   Schoenberg ......... G02B 27/017

* cited by examiner

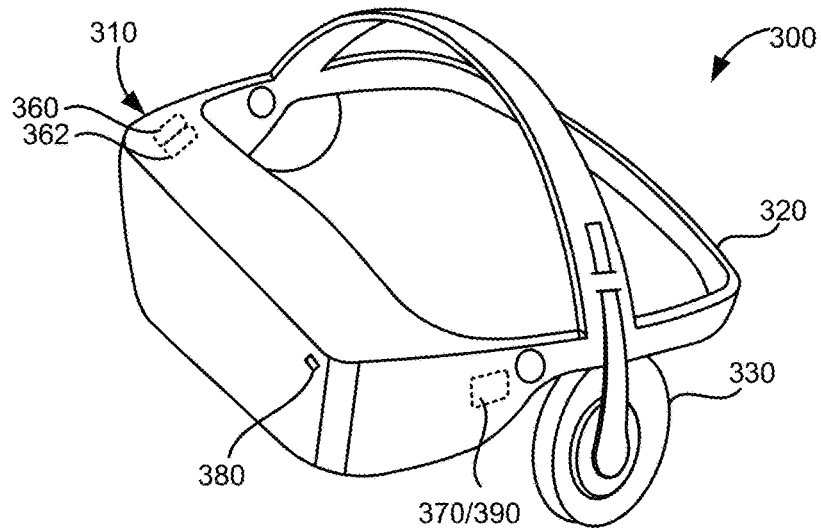
FIG. 3A
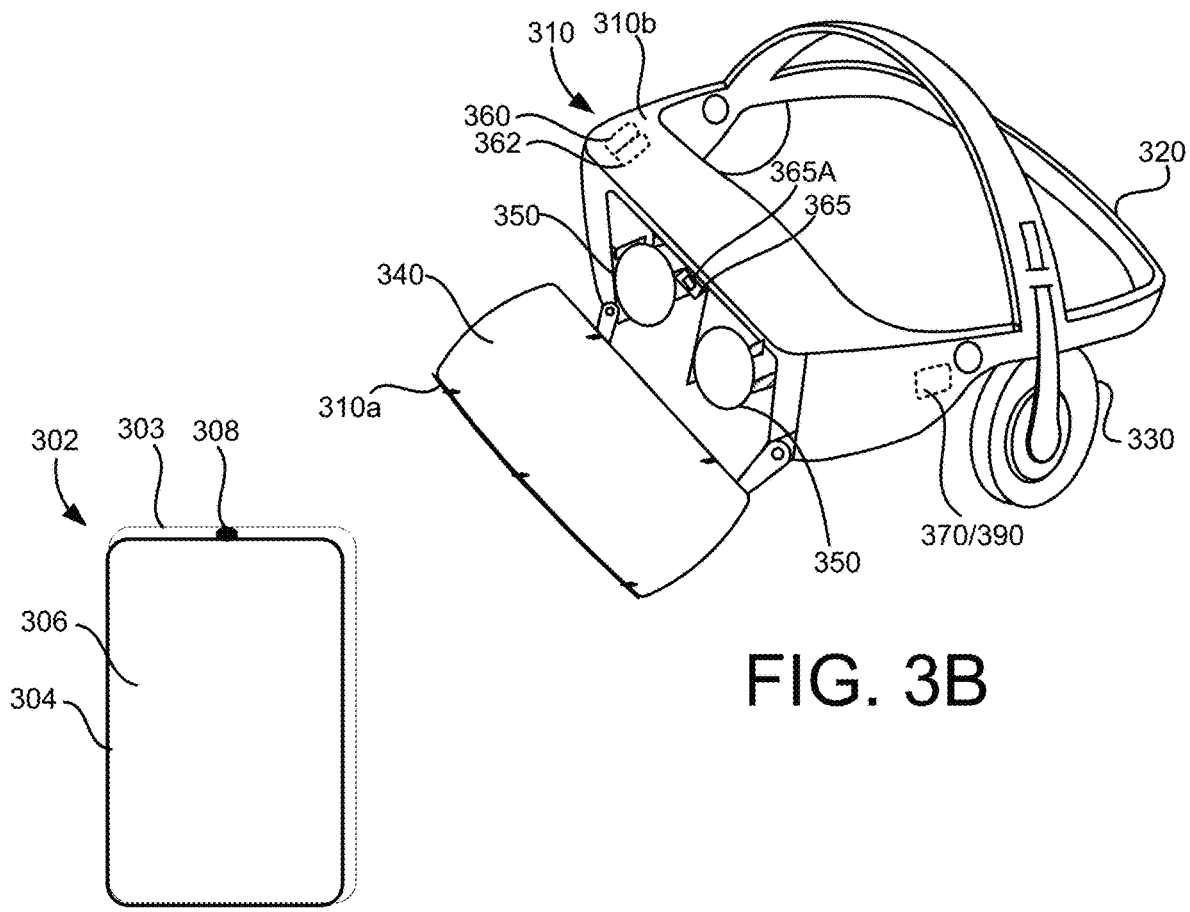
FIG. 3C
FIG. 3B

VOLUMETRIC MULTI-SELECTION INTERFACE FOR SELECTING MULTIPLE OBJECTS IN 3D SPACE

CROSS-REFERENCE TO RELATED APPLICATION

This application claims priority to U.S. Application No. 62/529,221, filed on Jul. 6, 2017, the disclosure of which is incorporated herein by reference in its entirety.

BACKGROUND

Virtual reality (VR) fundamentally adds a third dimension of interaction, which has implications for selecting multiple items with a singular gesture. Techniques that are applicable in two-dimensional (2D) interfaces may not be appropriate for three-dimensional (3D) interfaces. In some 2D interfaces, the user defines a region in terms of both dimensions (i.e., a horizontal dimension and a vertical dimension). Applying this same approach in 3D may cause issues due to, for example, occlusion and ambiguity discerning which items should be included in the selection region. Using this approach in 3D, the selection region becomes a symmetric, rectangular selection volume defined by a length in all three dimensions. This type of selection interface does not allow users to create arbitrarily shaped selections.

SUMMARY

This document relates, generally, to volumetric selection of multiple entities in 3D space. In some implementations, a 3D virtual reality environment includes an interface for volumetric selection of multiple entities.

One aspect is a computer-implemented method includes generating a selection region within a three-dimensional (3D) space and receiving a selection path user input to define a selection path. The method also includes defining a selection volume based on the selection region and the selection path and selecting entities within the 3D space based on the selection volume.

Another aspect is a computing device including at least one processor and memory storing instructions. When executed by the at least one processor, the instructions cause the computing device to generate a selection polygon within a 3D space and receive a selection path user input to define a selection path. The instructions also cause the computing device to define a selection volume based on the selection polygon and the selection path and select entities within the 3D space based on the selection volume.

Yet another aspect is a computer-implemented method including generating a selection polygon within a 3D space and receiving a first selection path user input to define a first portion of a selection path. The method also includes receiving an alter selection polygon user input and, responsive to receiving the alter selection polygon user input, altering the selection polygon. The method also includes receiving a second selection path user input to define a second portion of the selection path. Additionally, the method includes defining a selection volume based on the selection polygon and the selection path and selecting entities within the 3D space based on the selection volume.

The details of one or more implementations are set forth in the accompanying drawings and the description below. Other features will be apparent from the description and drawings, and from the claims.

BRIEF DESCRIPTION OF THE DRAWINGS

FIGS. 3A, 3B, and 3C are diagrams depicting an example head-mounted display device and controller, in accordance with implementations as described herein.

DETAILED DESCRIPTION

Implementations of the systems and methods disclosed herein provide an interface for defining an arbitrary volume and path in a single gesture that gives the user the fine control and specification to navigate a path through space, defining an arbitrary volume/geometry along that user-defined path. In some implementations, the volume may be displayed while being generated or after being generation. In some implementations, the volume is used for selecting entities but is not displayed. The volume may be defined by providing the user a selection geometry (which is also referred to as a selection region), such as a rectangle on a 2D plane, that the user can sweep through the 3D space while manipulating the selection geometry (e.g., the shape or size of the selection geometry). The 2D selection geometry can have any shape formed using any number of vertices. The 2D selection geometry can be altered during the sweeping to grow/shrink, or change shapes (e.g., to become rounder/more circular, to have a wider or narrower area between the vertices, both at the time of creation and at any point during the selection). For example, a user can move and/or rotate a handheld controller to sweep the selection geometry through the 3D VR environment in a corresponding motion, and can use one or more user-actuatable controls on the controller, such as a button or a touch-sensitive surface, to adjust the shape of the selection geometry.

Some implementations include additional selection methods to address potentially ambiguous situations, such as where many items of different types may be available for selection at once. A difficulty in this situation, relates to selecting vertices/edges/faces/meshes in a 3D environment. For example, some implementations limit users to a single type of selection once an initial choice is made. Some implementations intelligently select supersets (e.g., meshes) when multiple elements of the set (e.g., faces) are within a selection radius and it is determined that the user's precision (limited by factors such as tracking or average human tremor-stability) is incapable of distinguishing between the faces. Some implementations also vary selection thresholds based on the properties of the selection interaction, such as how long the user has already been selecting, how much world-space or volume the selection has already encompassed, and the velocity of the selection interaction.

Figure 1:
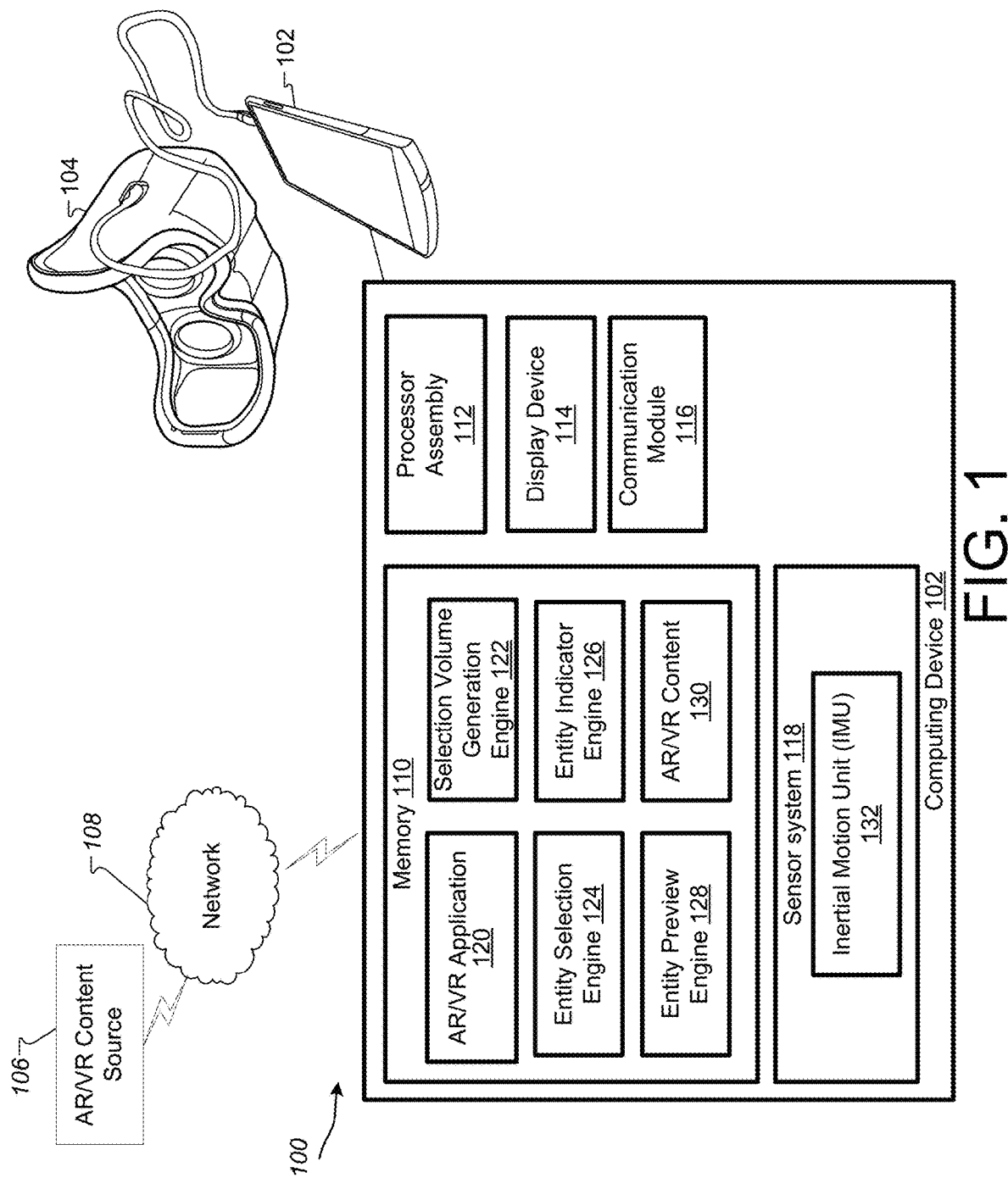
FIG. 1 is a block diagram illustrating a system according to an example implementation.

FIG. 1 is a block diagram illustrating a system 100 according to an example implementation. The system 100 generates an augmented reality (AR) environment (which can also be referred to as a mixed reality environment) or virtual reality (VR) environment for a user of the system 100. An AR environment or VR can be referred to as AR/VR. Even if described in terms of a virtual environment, the implementations described herein can be applied within an augmented reality environment, and vice versa. In some implementations, the system 100 includes a computing device 102, a head-mounted display device (HMD) 104, and an AR/VR content source 106. Also shown is a network 108 over which the computing device 102 may communicate with the AR/VR content source 106.

In some implementations, the computing device 102 is a mobile device (e.g., a smartphone) which may be configured to provide or output VR content to a user. The computing device 102 may include a memory 110, a processor assembly 112, a display device 114, a communication module 116, and a sensor system 118. The memory 110 may include an AR/VR application 120, a selection volume generation engine 122, an entity selection engine 124, an entity indicator engine 126, an entity preview engine 128, and AR/VR content 130. The computing device 102 may also include various user input components (not shown) such as a controller that communicates with the computing device 102 using a wired or wireless communications protocol.

The sensor system 118 may include various sensors, including an inertial motion unit (IMU) 132. Implementations of the sensor system 118 may also include different types of sensors, including, for example, a light sensor, an audio sensor, an image sensor, a distance and/or proximity sensor, a contact sensor such as a capacitive sensor, and/or other sensors and/or different combination(s) of sensors.

The IMU 132 detects motion, movement, and/or acceleration of the computing device 102 and/or the HMD 104. The IMU 132 may include various different types of sensors such as, for example, an accelerometer, a gyroscope, a magnetometer, and other such sensors. A position and orientation of the HMD 104 may be detected and tracked based on data provided by the sensors included in the IMU 132. The detected position and orientation of the HMD 104 may allow the system to in turn, detect and track the user's gaze direction and head movement.

The AR/VR application 120 may present or provide the AR/VR content to a user via one or more output devices of the computing device 102 such as the display device 114, a speaker (not shown), and/or other output devices. In some implementations, the AR/VR application 120 includes instructions stored in the memory 110 that, when executed by the processor assembly 112, cause the processor assembly 112 to perform the operations described herein. For example, the AR/VR application 120 may generate and present an AR/VR environment to the user based on, for example, AR/VR content, such as the AR/VR content 130 and/or AR/VR content received from the AR/VR content source 106. The AR/VR content 130 may include 3D scenes that can be rendered as images or videos for display on the display device 114. For example, the 3D scene can include one or more entities represented as polygonal meshes. The polygonal meshes may be associated with various surface textures, such as colors and images. The 3D scene may also include other information such as, for example, light sources that are used in rendering the 3D scene.

The AR/VR application 120 may use the selection volume generation engine 122 to generate a selection volume. The selection volume generation engine 122 may initiate a selection session in response to a user input, such as an initiate selection user input. The selection session may continue until a terminate selection session user input is received. In some implementations, the initiate selection session user input and the terminate selection session user input can be performed as a single continuous action by a user. For example, a user may press, hold, and release a button (or trigger or a different type of user actuatable control) on a handheld controller to initiate and terminate a selection session. In this example, pressing the button is an example of an initiate selection session user input and releasing the button is an example of a terminate selection session user input. Holding the button down is an example of a maintain selection session user input. Other types of input can be used to initiate, maintain, and terminate a selection session too, such as swipes, touchscreen gestures, hand gestures, spoken commands, or head/eye motions. Responsive to receiving a selection session termination input, the selection volume generation engine 122 may define a selection volume that can be used by the entity selection engine 124.

In response to an initiate selection user input, a selection region may be generated. The selection region may, for example, be defined by a selection polygon. The selection polygon may be a planar polygon and may have any number of sides. For example, the selection polygon may be a triangle or a rectangle. In some implementations, the selection polygon may be a regular polygon (i.e., a polygon in which each of the sides are the same length and each of the corners have the same angle) having few or many sides (e.g., to approximates a circle). The selection polygon may also be an irregular polygon. The selection region may also be defined, for example, by one or more curves.

In some implementations, the selection region may be displayed in the AR/VR environment. For example, the selection region may be displayed as a polyline (i.e., a sequence of line segments) within the AR/VR environment. The polyline may be displayed using a solid or dashed line. The selection region may be oriented and positioned within the AR/VR environment based on various properties. The orientation and position may be based on a physical orientation and position of a handheld controller (which may be determined with an IMU). The physical orientation and position of the handheld controller may be mapped to an orientation and position within the AR/VR environment. For example, the handheld controller may control a virtual cursor in the AR/VR environment. The selection region may also be positioned or oriented based on a gaze direction of the user, a head position or orientation of the user, a hand position or orientation of the user. The selection region may also be positioned or oriented at a default position and orientation.

In some implementations, various other inputs can be received during a selection session (e.g., while a button is being held down) to define the selection volume. For example, the selection volume generation engine 122 may be configured to receive one or more selection path user inputs during the selection session. The selection path user inputs (which also can be referred to as a selection-path user input) may define a selection path or segments (which are sometimes referred to as selection path segments) of a selection path. In some implementations, the selection path segments include a polyline. The polyline may be defined by a sequence of vertices in a 3D coordinate system associated with the AR/VR environment. The selection path may include one or more selection path segments. The selection path may also be defined by one or more curves.

The selection path user input may include moving and rotating the handheld controller around in a physical space. In some implementations, as the handheld controller is moved and rotated, a sequence of positions and orientations of the handheld controller in a physical space may be determined. In some implementations, the position and orientation of the handheld controller in the physical space may be sampled at a specific frequency (e.g., every 0.01 seconds, 0.05 seconds, 0.1 seconds, 0.5 seconds). The positions and orientations of the handheld controller in the physical space can then be mapped to virtual positions and orientations in the AR/VR environment. In some implementations, only the position of the handheld controller is mapped to the physical space. In at least some of these implementations, the orientation is then determined based on changes in position.

In some implementations, a partial selection volume is generated and/or displayed as a selection path user input is being received. For example, displaying the partial selection volume may include displaying copies of the selection region at multiple positions and orientations along the selection path. In some implementations, a copy of the selection region may be displayed at specific distance intervals along the selection path. The distance intervals may be determined based on a distance calculated in the 3D coordinate system associated with the AR/VR environment. Additionally, the partial selection volume may be displayed by, for example, displaying faces or lines that connect adjacent copies of the selection region.

The selection volume generation engine 122 may be configured to also receive one or more alter selection region user inputs during the selection session. Responsive to receiving the alter selection region user input, the selection volume generation engine 122 may alter the size of the selection region and/or the shape of the selection polygon. For example, receiving the alter selection region user input may include receiving a swipe input on a touchscreen. In some implementations, a swipe input along a first coordinate axis of the touchscreen (e.g., a horizontal axis) indicates to alter the shape of the selection region and a swipe input along a perpendicular coordinate axis of the touchscreen (e.g., a vertical axis) indicates to alter the size of the selection region. Diagonal swipe inputs may alter both the size and the shape of the selection region (e.g., in proportion to the projection of the swipe input onto the coordinate axes).

Altering the shape of the selection region may include making the selection region more or less round (e.g., increasing/decreasing the number of sides of a regular polygon). Altering the shape of the selection region may also include making the selection region more or less oblong (or eccentric). For example, altering the shape of the selection region may adjust the selection region from a circle to an ellipse.

Altering the shape of the selection region may also include switching (or cycling) between a set of selection region shapes. The set of selection region shapes may be contextual. For example, the contextual selection region shapes may be based on entities in the AR/VR environment. Additionally, the contextual selection region shapes may be based on entities in the AR/VR environment region proximate the selection region. For example, the contextual selection region shapes may be based on entities within a predefined threshold of the selection region.

In some implementations, the direction of the selection path is also used to identify entities in the AR/VR environment. For examples, entities within a threshold distance in front of the selection path (e.g., in the direction the selection path is currently being extended) are used to generate contextual selection region shapes.

In some implementation, the entities in the AR/VR environment that are used to generate contextual selection region shapes include virtual entities (or virtual objects). For example, specific types of virtual entities may be associated with specific selection region shapes. Using a selection region having a specific shape may allow selection of only the associated specific type of virtual entities. In some implementations, the virtual entities correspond to files in a file system, and different types of files are associated with different selection region shapes. The selection volume generation engine 122 may generate contextual selection region shapes that a user may select from based on the types of files that are proximate to the portion of the selection path that is currently being defined. For example, a specific selection region shape may be associated with spreadsheet files and, when the selection path is near spreadsheet files, that shape may be presented. Similarly, the contextual selection region shapes can be based on physical entities (or physical objects) in the real world proximate the user. These physical entities may be recognized using shape or object recognition techniques such as machine learning modules.

In some implementations, a preview selection region shape is presented and a user is prompted to enter a user input to switch to the preview selection region shape. The preview selection region shape may be displayed in a corner of the user's field of view. In some implementations, the preview selection region shape is briefly flashed in the user's field-of-view. In some implementations, an animation associated with the preview selection region shape may be displayed in a portion of the user's field of view. If the user wishes to switch to the preview selection region shape, the user may provide the appropriate alter selection region user input. The preview selection region shape may be generated based on virtual or real-world entities in the AR/VR environment. The alter selection region user input may include swipes on a touch screen, spoken commands, hand gestures (e.g., opening/closing a hand), head or eye movements, and other types of user input.

Altering the size of the selection region may include increasing or decreasing the selection region by a uniform amount (e.g., by 0.1 units), by a uniform percentage (e.g., by 2%) or by a dynamically determined amount. The amount of size alteration may be based on, for example, a distance between the user and the selection path, the portion of the user's field-of-view occupied by the selection region, and the duration of the selection activity.

In some implementations, selection volume generation engine 122 defines the selection path in multiple selection path segments that are each associated with different selection regions. For example, a first selection path segment may be defined before a selection region user input is received and a second selection path segment may be defined after the selection region user input is received. The first selection path segment may be associated with a first selection region and the second selection path may be associated with a second selection region (i.e., the altered selection region). In some implementations, the selection region is altered smoothly along a selection path. For example, a selection path may include three selection path segments. The first selection path segment may be associated with an initial selection region shape, the third selection path segment may be associated with an altered selection region shape, and the second selection path segment may be associated with a varying selection region shape that is interpolated between the initial selection region shape and the altered selection region shape.

Generation the selection volume may include sweeping the selection region along the received selection path. Sweeping the selection region may include moving the selection region along the selection path and orienting the selection region based on the selection path. In some implementations, the selection region is a planar polygon. Orienting the selection region may include orienting the selection region so that a normal direction to the planar polygon is parallel with a direction of the selection path. The direction of the selection path may be determined based on the direction between two adjacent positions along the selection path.

The entity selection engine 124 may then use the selection volume to select entities, such as polygonal meshes or other types of computer-generated entities in an AR/VR environment. The entity selection engine 124 may also select real-world entities from the physical environment around the computing device 102 in an AR environment. In some implementations, the entity selection engine 124 selects a combination of real-world entities and polygonal meshes (or other types of computer-generated entities).

In some implementations, the entity selection engine 124 selects entities as the selection volume is being generated. For example, the entity selection engine 124 may repeatedly select entities based on a partial selection volume while the selection path user input is being received. Selecting entities may include setting a state associated with an entity to selected. In some implementations, the display of selected entities may be altered. For example, selected entities may be displayed with a particular visual display property (e.g., color, transparency level). In some implementations, selected entities may be displayed with an increasing level of transparency as the selection path gets close to the entities (e.g., to indicate that there is no need to try to select the entities).

Once the entities are selected, various operations can be performed with respect to the selected entities. Almost any type of operation can be performed. The operation may be applied to only selected entities. For example, the operation may be performed on only those entities that have the selected property set. Example operations include copying, deleting, moving, and altering the selected entities.

In some implementations, the entity selection engine 124 selects any entities that at least partially intersect with the selection volume. In some implementations, only entities that are fully contained within the selection volume are selected. In some implementations, the entity selection engine 124 selects entities in which a majority of the entity is within the selection volume. In some implementations, entities are selected when a portion of the entity is within the selection volume and the remainder of the entity is within a threshold distance of the selection volume. The threshold distance may be determined based on an estimate of the user's precision. The user's precision may be estimated based on tracking user accuracy or average human tremor-stability. In some implementations, the threshold is adjusted based on the duration of the selection session. In some implementations, portions of entities may be selected (e.g., the portions that are contained within the selection volume).

The entity indicator engine 126 may display and alter entity indicators in the AR/VR environment. For example, the entity indicators may include flags that identify properties of entities of the AR/VR environment. The entity indicators may indicate the types of entities or a storage location of the entities. In some implementations, the entity indicators may be associated with a portion of the AR/VR environment. The portion may have a regular or irregular border. For example, the entity indicators may be associated with a radius and may define a volume based on the radius. The border of the portion associated with an entity indicator may be displayed in response to a specific type of user input. In some implementations, operations performed on the entity indicator may also be performed on entities that are within the volume. For example, a move operation performed on an entity indicator may cause the entities within the volume to also move. In some implementations, selecting an entity indicator may cause all of the associated entities to be selected too.

The entity preview engine 128 displays previews of information associated with entities in the AR/VR environment. The previews may be displayed based on a preview user input. Examples of a preview user input include a point (e.g., with a cursor in the AR/VR environment), a point and click (e.g., of a button or a trigger on a control), a point and hover, a point and hold (e.g., of the button or trigger). The preview user input may also include a specific type of gaze (e.g., as determined with a gaze detection), an eye movement, or a head movement. The preview may include various information about an identified entity. For example, if the identified entity corresponds to a file in the file system, the preview may include metadata associated with the file, a thumbnail of the contents of the file, or the full content of the file.

The AR/VR application 120 may update the AR/VR environment based on input received from the IMU 132 and/or other components of the sensor system 118. For example, the IMU 132 may detect motion, movement, and/or acceleration of the computing device 102 and/or the display device 114. The IMU 132 may include various different types of sensors such as, for example, an accelerometer, a gyroscope, a magnetometer, and other such sensors. A position and orientation of the HMD 104 may be detected and tracked based on data provided by the sensors included in the IMU 132. The detected position and orientation of the HMD 104 may allow the system to in turn, detect and track the user's gaze direction and head movement. Based on the detected gaze direction and head movement, the AR/VR application 120 may update the AR/VR environment to reflect a changed orientation and/or position of the user within the environment.

Although the computing device 102 and the HMD 104 are shown as separate devices in FIG. 1, in some implementations, the computing device 102 may include the HMD 104. In some implementations, the computing device 102 communicates with the HMD 104 via a cable, as shown in FIG. 1. For example, the computing device 102 may transmit audio and video signals to the HMD 104 for display for the user, and the HMD 104 may transmit motion, position, and/or orientation information to the computing device 102. In some implementations, the HMD 104 includes a chamber in which the computing device 102 may be placed. In some implementations, the user is able to view the display device 114 of the computing device 102 while wearing the HMD 104 (e.g., through lenses or apertures within the HMD 104). For example, the computing device 102 and the HMD 104 can together function as a stereoscopic viewer by partitioning a screen of the display device 114 into a first image that is viewable by only the left eye of the user when viewed through the HMD and a second image that is viewable by only the right eye of the user when viewed through the HMD.

The AR/VR content source 106 may generate and output AR/VR content, which may be distributed or sent to one or more computing devices, such as the computing device 102, via the network 108. In an example implementation, the AR/VR content includes three-dimensional scenes and/or images. Additionally, the AR/VR content may include audio/video signals that are streamed or distributed to one or more computing devices. The AR/VR content may also include an AR/VR application that runs on the computing device 102 to generate 3D scenes, audio signals, and/or video signals. According to an illustrative example implementation, virtual reality (VR), which may also be referred to as immersive multimedia or computer-simulated life, may, at least in some cases, replicate or simulate, to varying degrees, an environment or physical presence in places in the real world or imagined worlds or environments. Augmented reality (AR) may, at least in some cases, overlay computer generated images on a user's field of view of the real world.

The memory 110 can include one or more non-transitory computer-readable storage media. The memory 110 may store instructions and data that are usable to generate an AR/VR environment for a user.

The processor assembly 112 includes one or more devices that are capable of executing instructions, such as instructions stored by the memory 110, to perform various tasks, such as image and video rendering. For example, the processor assembly 112 may include a central processing unit (CPU) and/or a graphics processor unit (GPU). For example, if a GPU is present, some video rendering tasks may be offloaded from the CPU to the GPU.

The display device 114 may, for example, include an LCD (liquid crystal display) screen, an OLED (organic light emitting diode) screen, a touchscreen, or any other screen or display for displaying images or information to a user. In some implementations, the display device 114 includes a light projector arranged to project light onto a portion of a user's eye.

The communication module 116 includes one or more devices for communicating with other computing devices, such as the AR/VR content source 106. The communication module 116 may communicate via wireless or wired networks.

The network 108 may be the Internet, a local area network (LAN), a wireless local area network (WLAN), and/or any other network. A computing device 102, for example, may receive the audio/video signals, which may be provided as part of VR content in an illustrative example implementation.

Figure 2:
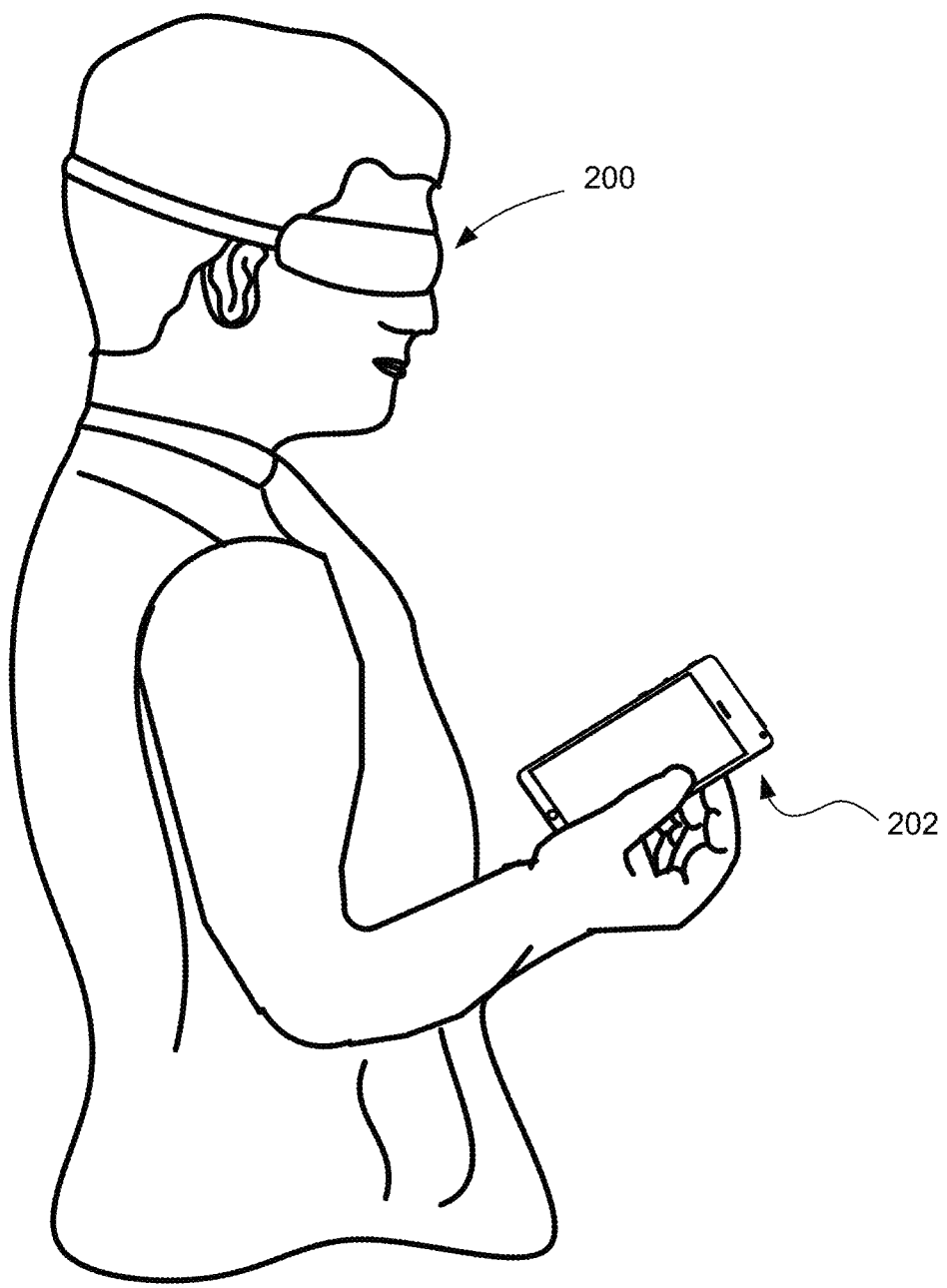
FIG. 2 is a diagram depicting an example head-mounted display device.

FIG. 2 illustrates an example implementation of an HMD as shown in FIG. 1, such as the HMD 104. In FIG. 2, a user wearing an HMD 200 is holding a portable handheld electronic device 202. The handheld electronic device 202 may be, for example, a smartphone, a controller, a joystick, or another portable handheld electronic device that may be paired with, and communicate with, the HMD 200 for interaction in the immersive environment generated by the HMD 200. The handheld electronic device 202 may be operably coupled with, or paired with the HMD 200 via, for example, a wired connection, or a wireless connection such as, for example, a WiFi or BLUETOOTH connection. This pairing, or operable coupling, of the handheld electronic device 202 and the HMD 200 may provide for communication between the handheld electronic device 202 and the HMD 200 and the exchange of data between the handheld electronic device 202 and the HMD 200. This may allow the handheld electronic device 202 to function as a controller in communication with the HMD 200 for interacting in the immersive environment generated by the HMD 200 (e.g., to initiate and control entity selection, to place and manipulate entity indicators, and to trigger previews of entities). That is, a manipulation of the handheld electronic device 202, such as, for example, a beam or ray emitted by the handheld electronic device 202 and directed to a portion of the immersive environment such as virtual user interface element, and/or an input received on a touch surface of the handheld electronic device 202, and/or a movement of the handheld electronic device 202, may be translated into a corresponding command, selection, or movement, or other type of interaction, in the immersive environment generated by the HMD 200. For example, the HMD 200, together with the handheld electronic device 202, may generate a selection volume and select entities in the immersive environment as described above, and the handheld electronic device 202 may be manipulated to provide user inputs to define the selection volume as described above.

FIGS. 3A and 3B are perspective views of an example HMD, such as, for example, the HMD 200 worn by the user in FIG. 2, and FIG. 3C illustrates an example handheld electronic device, such as, for example, the handheld electronic device 202 shown in FIG. 2.

The handheld electronic device 302 may include a housing 303 in which internal components of the device 302 are received, and a user interface 304 on an outside of the housing 303, accessible to the user. The user interface 304 may include a touch sensitive surface 306 configured to receive user touch inputs. The user interface 304 may also include other components for manipulation by the user such as, for example, actuation buttons, knobs, joysticks and the like. These components of the user interface 304 may be used to provide inputs and to trigger various actions with respect to content that is being displayed in the HMD 300. For example, the HMD 300 may initiate a selection session based on the actuation of one of the components. In some implementations, actuation of one of the components may also alter a selection region.

In some implementations, at least a portion of the user interface 304 may be configured as a touchscreen, with that portion of the user interface 304 being configured to display user interface items to the user, and also to receive touch inputs from the user on the touch sensitive surface 306. The handheld electronic device 302 may also include a light source 308 configured to selectively emit light, for example, a beam or ray, through a port in the housing 303, for example, in response to a user input received at the user interface 304.

The HMD 300 may include a housing 310 coupled to a frame 320, with an audio output device 330 including, for example, speakers mounted in headphones, also being coupled to the frame 320. In FIG. 3B, a front portion 310*a* of the housing 310 is rotated away from a base portion 310*b* of the housing 310 so that some of the components received in the housing 310 are visible. A display 340 may be mounted on an interior facing side of the front portion 310*a* of the housing 310. Lenses 350 may be mounted in the housing 310, between the user's eyes and the display 340 when the front portion 310*a* is in the closed position against the base portion 310*b* of the housing 310. In some implementations, the HMD 300 may include a sensing system 360 including various sensors and a control system 370 including a processor 390 and various control system devices to facilitate operation of the HMD 300.

In some implementations, the HMD 300 may include a camera 380 to capture still and moving images. The images captured by the camera 380 may be used to help track a physical position of the user and/or the handheld electronic device 302 in the real world, or physical environment relative to the immersive environment, and/or may be displayed to the user on the display 340 in a pass through mode, allowing the user to temporarily leave the immersive environment and return to the physical environment without removing the HMD 300 or otherwise changing the configuration of the HMD 300 to move the housing 310 out of the line of sight of the user.

For example, in some implementations, the sensing system 360 may include an inertial measurement unit (IMU) 362 that includes various different types of sensors such as, for example, an accelerometer, a gyroscope, a magnetometer, and other such sensors. A position and orientation of the HMD 300 may be detected and tracked based on data provided by the sensors included in the IMU 362. The detected position and orientation of the HMD 300 may allow the system to in turn, detect and track the user's head, gaze direction, and/or movement. Based on the determined position and orientation of the HMD 300, the HMD 300 may receive inputs to initiate a selection session, define a selection volume, and select entities within the AR/VR environment based on the selection volume. The sensing system 360 may also include an ambient light sensor and/or a capacitive sensor. The HMD 300 may use the ambient light sensor and/or the capacitive sensor to detect a device-mount event. The ambient light sensor may be disposed on the HMD 300 such that the ambient light sensor measures an ambient light level near the user's eyes when the HMD 300 is mounted. For example, the HMD 300 may determine whether the HMD 300 has been mounted or removed.

In some implementations, the HMD 300 may include a gaze tracking device 365 to detect and track an eye gaze of the user. The gaze tracking device 365 may include, for example, an image sensor 365A, or multiple image sensors 365A, to capture images of the user's eyes, for example, a specific portion of the user's eyes, such as, for example, the pupil, to detect, and track direction and movement of, the user's gaze. In some implementations, the HMD 300 may be configured so that the detected gaze is processed as a user input to be translated into a corresponding interaction in the immersive virtual experience.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Figure 4:
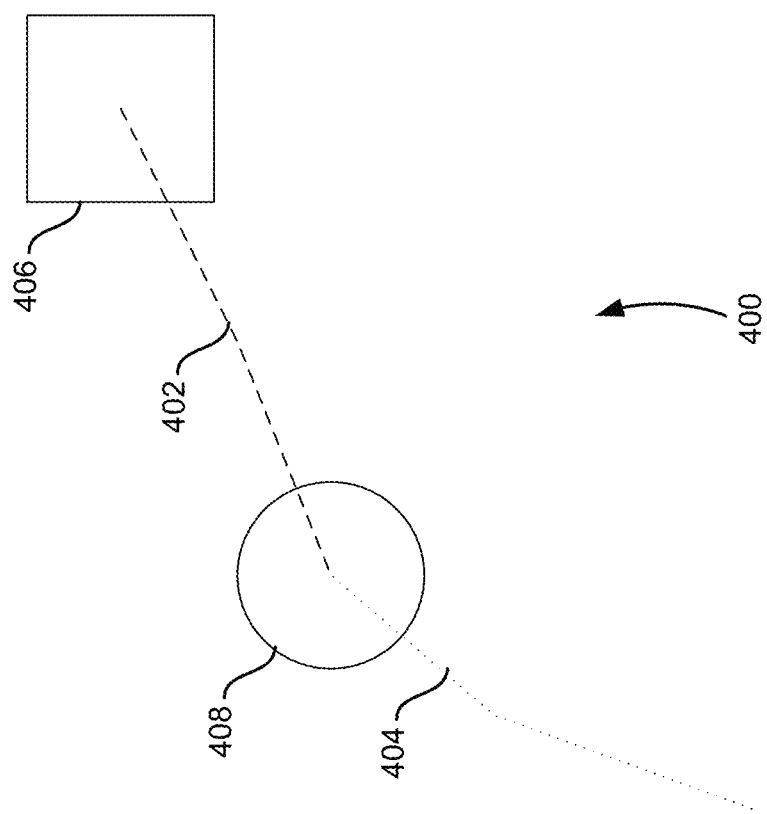
FIG. 4 is a schematic diagram of an example selection path generated in accordance with implementations as described herein.

FIG. 4 is a schematic diagram of an example selection path 400 that may be generated by embodiments of the selection volume generation engine 122. In this example, the selection path 400 includes a first selection path segment 402 and a second selection path segment 404. The first selection path segment 402 is associated with a first selection region 406 and the second selection path segment 404 is associated with a second selection region 408. Here, the first selection region 406 is square shaped and the second selection region 408 is circular. The selection path 400 may be generated based on a selection path user input (e.g. a movement of a handheld controller). In this example, the first selection path segment 402 corresponds to the portion of the selection path 400 received before receiving an alter selection region user input and the second selection path segment 404 corresponds to the portion of the selection path 400 received after receiving an alter selection region user input. Although the selection path 400 is shown in FIG. 4, in at least some implementations, the selection path 400 is not displayed. In some implementations, the first selection region 406 is shown (displayed) moving along the first selection path segment 402 as the first selection path segment 402 is being defined then the second selection region 408 is shown (displayed) moving along the second selection path segment 404 as the second selection path segment 404 is being defined. In some implementations, a volume is displayed as the selection path 400 is being defined.

Figure 5:
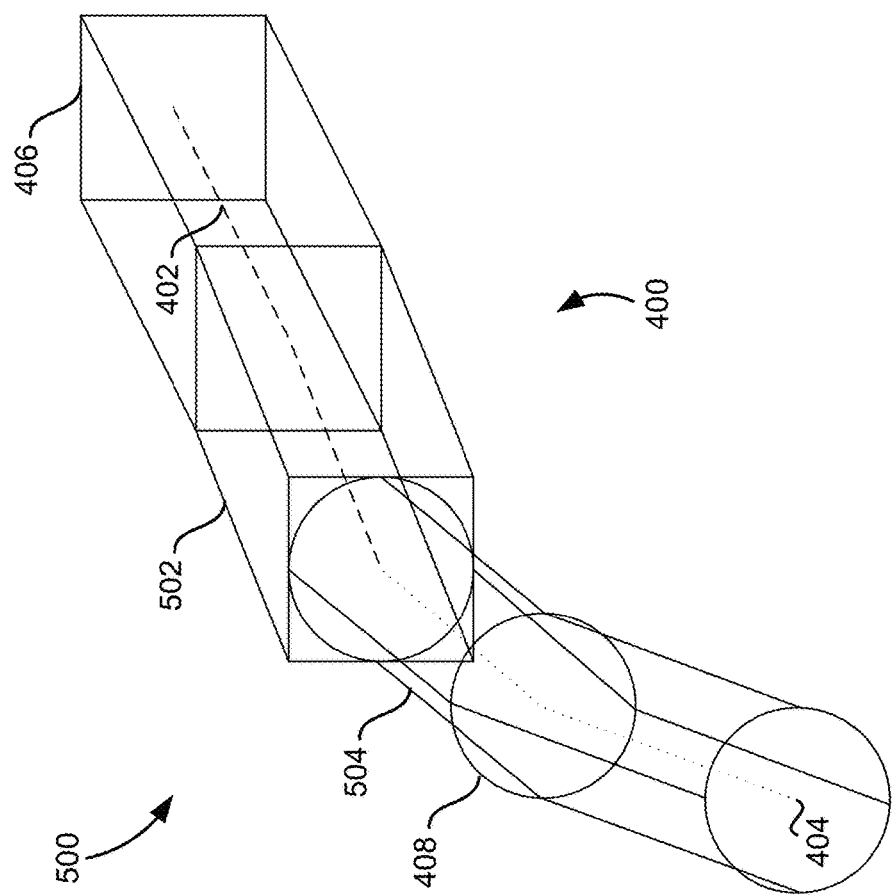
FIG. 5 is a schematic diagram of an example selection volume generated in accordance with implementations as described herein.

FIG. 5 is a schematic diagram of an example selection volume 500 that may be generated by embodiments of the selection volume generation engine 122. The selection volume 500 is generated from the selection path 400. The selection volume 500 includes a first selection volume portion 502 and a second selection volume portion 504. The first selection volume portion 502 is generated by sweeping the first selection region 406 along the first selection path segment 402. The second selection volume portion 504 is generated by sweeping the second selection region 408 along the second selection path segment 404. In some implementations, portions of the selection volume 500 are displayed as the selection volume 500 is being defined. For example, a portion of the selection volume 500 may be displayed that extends from the beginning of the selection path 400 to a position on the selection path that is currently being specific via user input. As noted above with respect to FIG. 4, in at least some implementations, the selection path 400 is not displayed.

Figure 6:
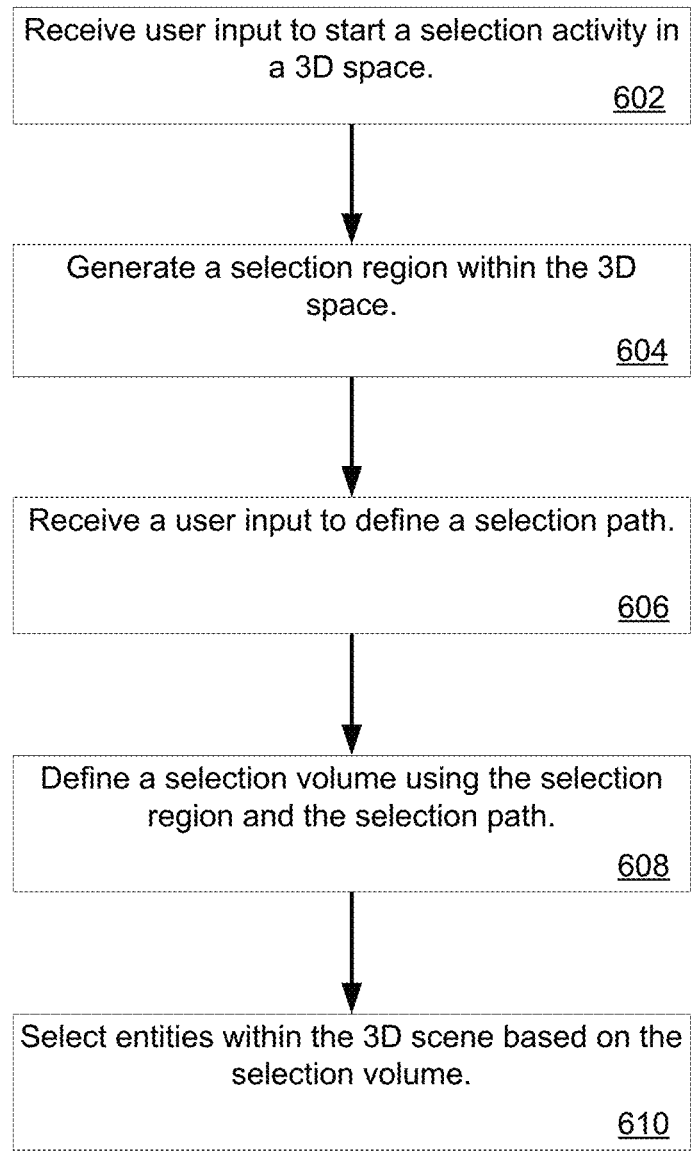
FIG. 6 is a flowchart of a method, in accordance with implementations as described herein.

A method 600 of selecting entities in AR/VR environment, in accordance with implementations as described herein, is shown in FIG. 6. The method 600 may be performed by implementations of the selection volume generation engine 122 and the entity selection engine 124.

At operation 602, a user input to start a selection activity in a 3D space is received. The 3D space may be the AR or VR environment. The selection activity may be associated with a selection session and the user input may be an initiate selection session user input. For example, the initiate selection session user input may include pressing a button.

At operation 604, a selection region is generated within the 3D space. The selection region may include a selection polygon. The selection polygon may be planar. The selection region may have a default initial shape.

At operation 606, a user input is received to define a selection path. The user input may be a selection path user input. For example, the selection path user input may be define a path that includes several line segments. The line segments may be based on movements of a handheld controller. The position and orientation of the handheld controller may, for example, be mapped to positions and orientations in the 3D space.

At operation 608, a selection volume is defined based on the selection region and the selection path. For example, the selection volume may be defined by sweeping the selection region along the selection path. Sweeping the selection region along the selection path may include positioning copies of the selection region to multiple positions along the selection path and joining the adjacent copies of the selection regions to define a selection volume. Sweeping the selection region along the selection path may comprising incrementally moving the selection region along the selection path to define a volume. Sweeping the selection region along the selection path may also include reorienting the selection region. For example, the selection region may be reoriented so that a normal to selection region is aligned with a direction of the selection path.

At operation 610, entities within the 3D scene are selected based on the selection volume. For example, entities that are fully contained within the selection volume may be selected in some implementations. In some implementations, any entities that at least partially intersect the selection volume are selected. As described above, selection of entities may also be based on a user precision threshold value.

Figure 7:
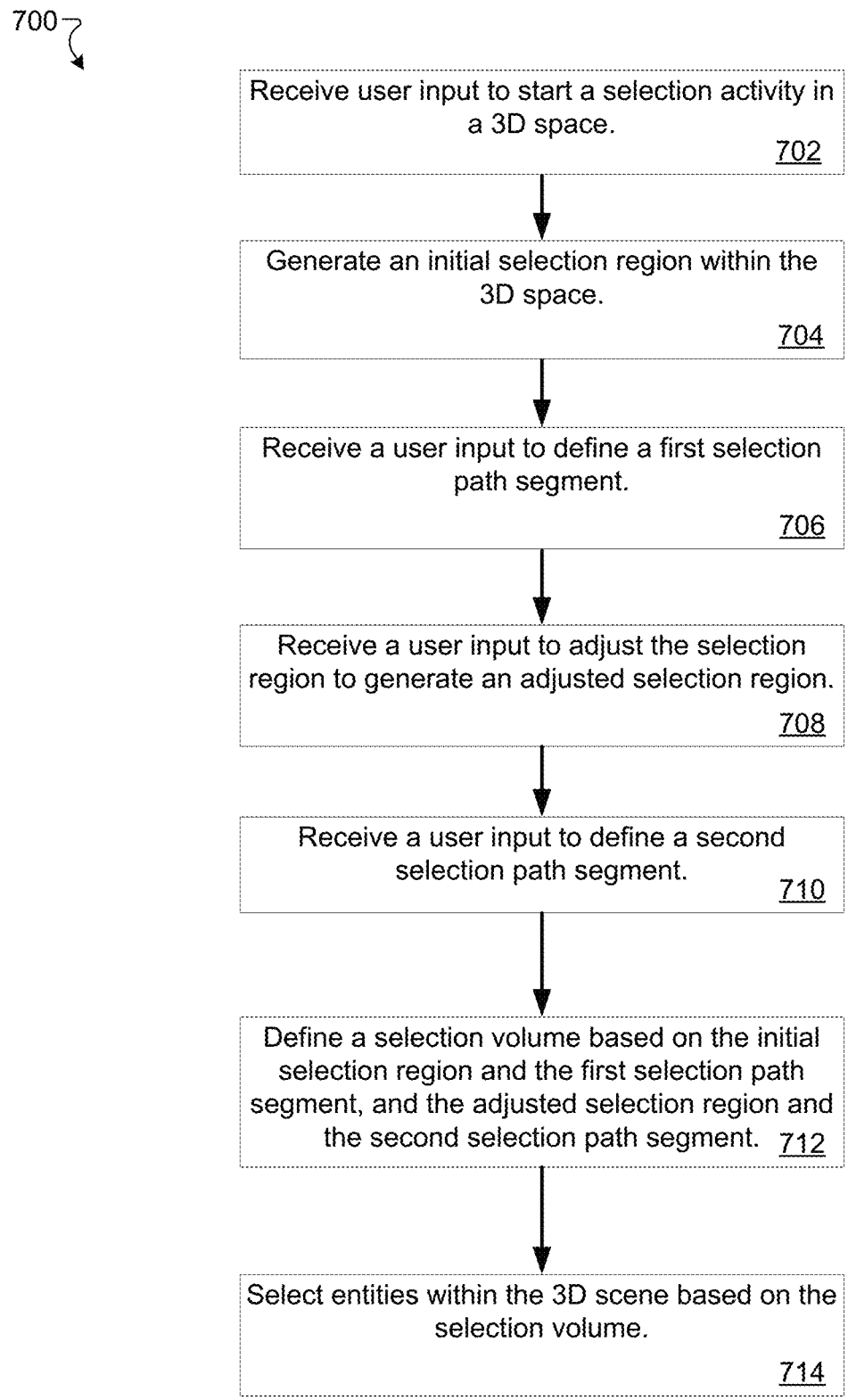
FIG. 7 is a flowchart of a method, in accordance with implementations as described herein.

A method 700 of selecting entities in AR/VR environment, in accordance with implementations as described herein, is shown in FIG. 7. The method 700 may be performed by implementations of the selection volume generation engine 122 and the entity selection engine 124.

At operation 702, a user input is received to start a selection activity in a 3D space. The operation 702 may be performed similarly to the operation 602, which has been previously described.

At operation 704, an initial selection region is generated within the 3D space. The operation 704 may be performed similarly to the operation 604, which has been previously described.

At operation 706, a user input is received to define a first selection path segment. The first selection path segment is a first part of selection path. A selection path may have one or more selection paths. Each selection path segment in a selection path may be associated with a selection region (e.g., a shape or size) or a transition between selection regions (e.g., a transition from one shape to another). The operation 706 may be performed similarly to the operation 606, which has been previously described.

At operation 708, a user input to adjust the selection region is received to generate an adjusted selection region. For example, an alter selection region user input (e.g., an alter selection polygon user input) may be received. As described above, an alter selection region user input may be received via a touch input on a touch sensitive surface or via another user input control. The altered selection region may be based on the initial selection region. For example, the altered selection region may be generated by altering the size of the initial selection region. The altered selection region may also be generated by altering the shape of the initial selection region.

At operation 710, a user input, such as a selection path user input, is received to define a second selection path segment. The operation 710 may performed similarly to the operation 706.

At operation 712, a selection volume is defined based on the initial selection region and the first selection path segment, and the adjusted selection region and the second selection path segment. For example, a first selection volume portion may be generated based on sweeping the initial selection region along the first selection path segment, and a second selection volume portion may be generation based on seeping the adjusted selection region along the second selection path segment. The first selection volume portion and the second volume portion may then be joined to define the selection volume.

At operation 714, a entities are selected within the 3D scene based on the selection volume. The operation 714 may be performed similarly to the operation 610, which has been previously described.

Figure 8:
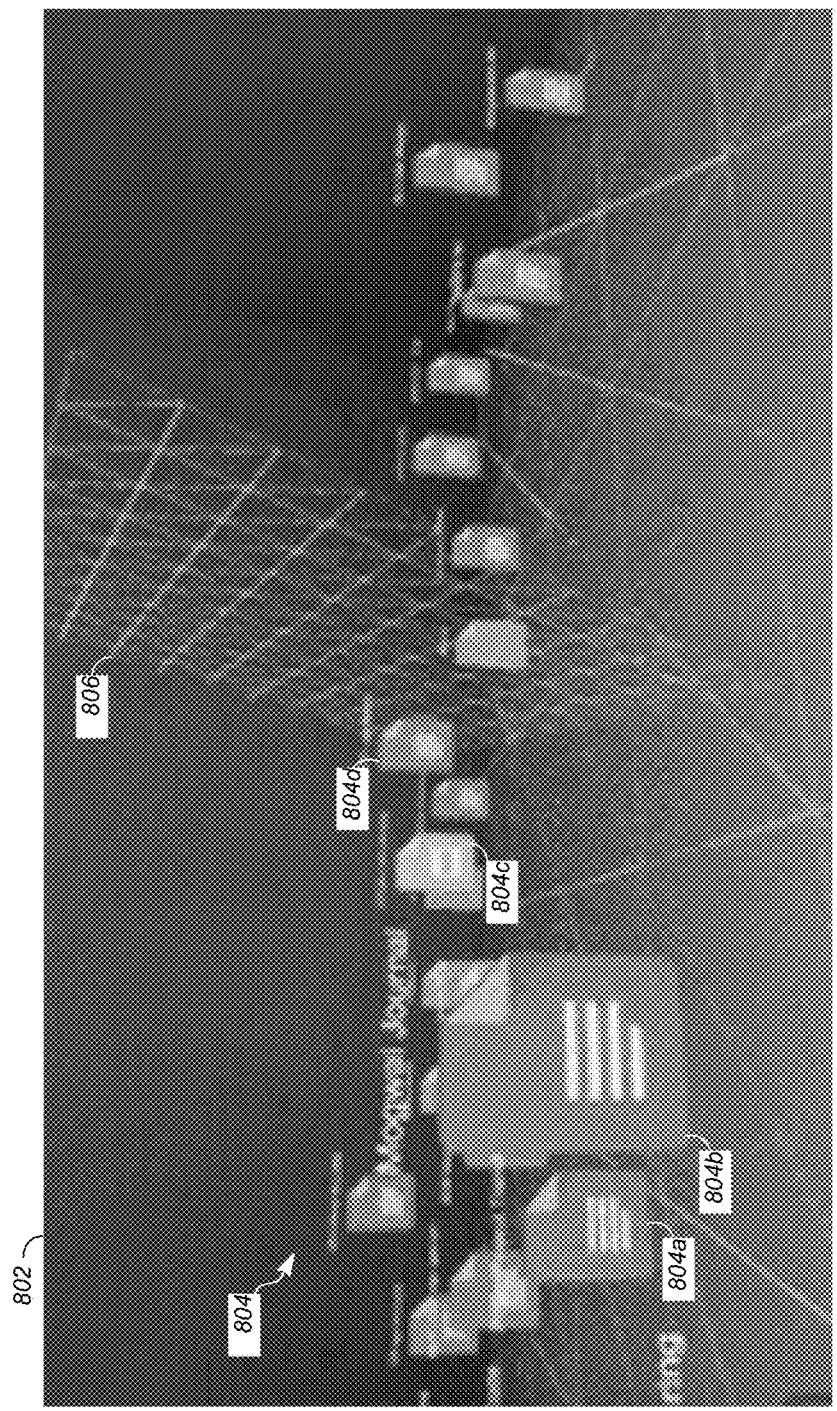
FIG. 8 is a schematic diagram of a frame from an AR/VR environment, in accordance with implementations as described herein.

FIG. 8 is a schematic diagram of a frame 800 from an example selection process, according to some implementations. The frame 800 shows a 3D environment 802. The 3D environment includes a plurality of entities 804. The entities 804 can correspond to, for example, files or documents stored in a file system or database. Additionally, the entities can represent different types of entities (e.g., some represent files, others represent records in a database, others represent users in a simulation). Although more entities are shown in FIG. 8, entities 804*a*, 804*b*, 804*c*, and 804*d* are indicated in FIG. 8. The plurality of entities 804 can include any number of entities. Also shown in FIG. 8 is a selection region 806. The selection region 806 can be a polygon, face, or any other type of geometry. In some implementations, the selection region 806 is generated when the user actuates a button on a handheld controller. Furthermore, the size of the selection region 806 may be adjusted based on various factors, such as how long the button is actuated, or a direction of a swipe across a touch-sensitive surface.

Figure 9:
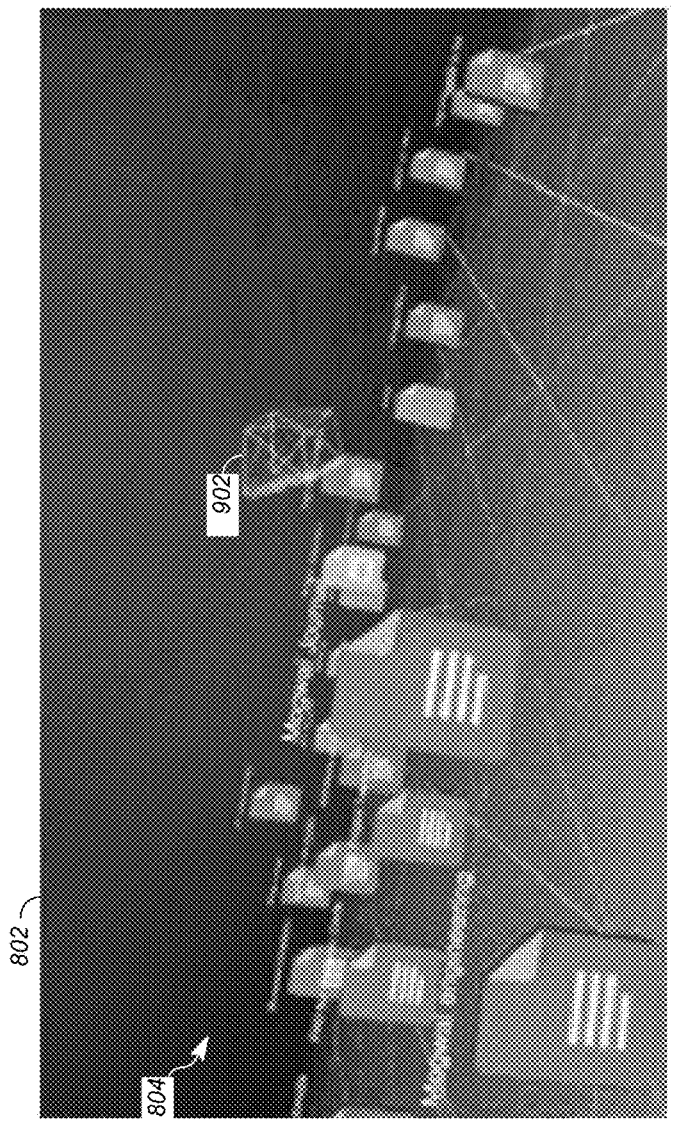
FIG. 9 is a schematic diagram of a frame from an AR/VR environment, in accordance with implementations as described herein.

FIG. 9 is a schematic diagram of a frame 900 that continues the example selection process of FIG. 8, according to some implementations. The frame 900 shows the 3D environment 802, which includes the plurality of entities 804. Also shown in the frame 900 is a selection volume 902. In some implementations, the selection volume 902 is formed by sweeping a selection region, such as the selection region 806, through the 3D environment 802. In some implementations, the sweeping is controlled by a user moving and/or rotating a handheld controller to define a selection path.

Figure 10:
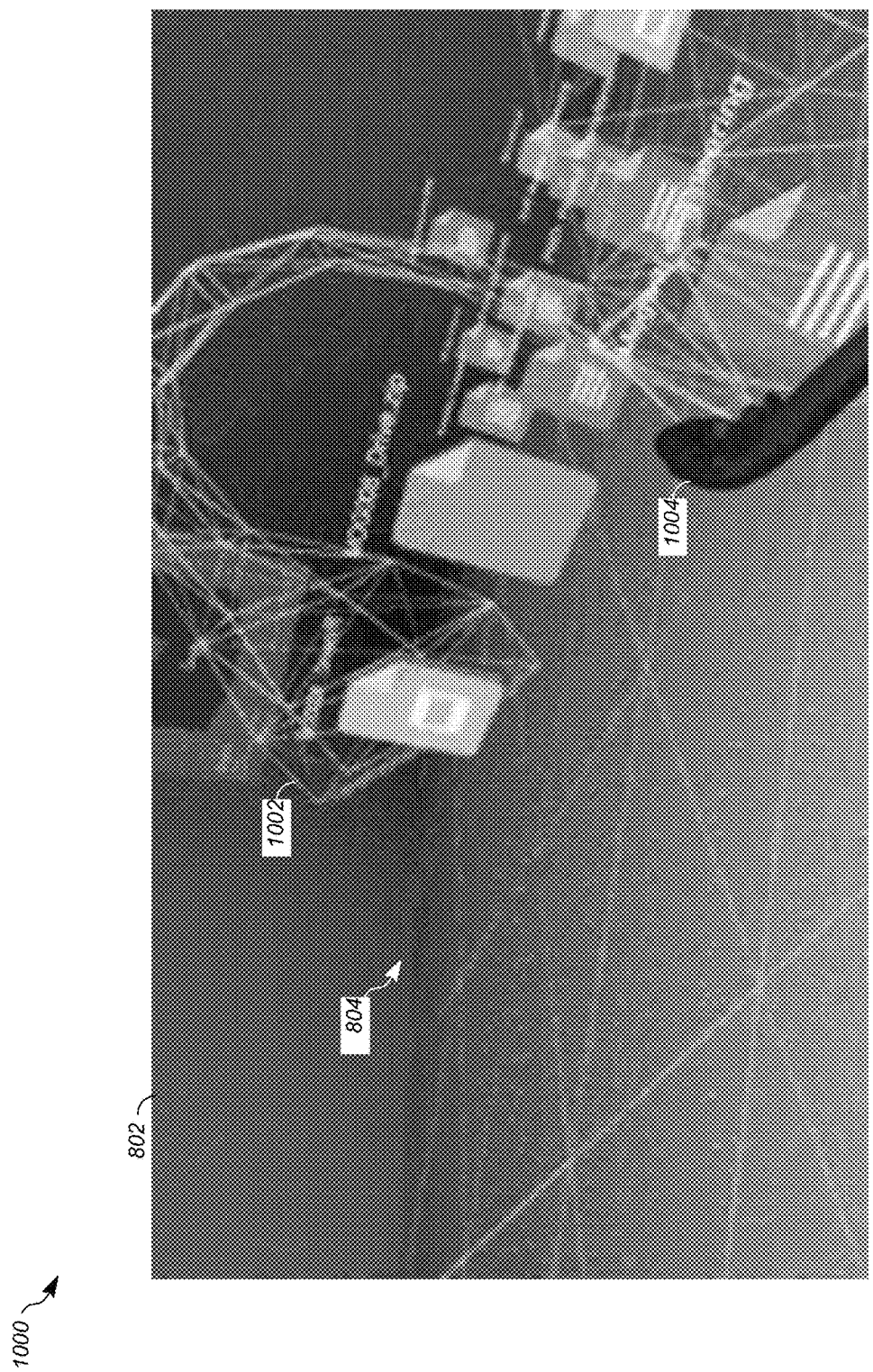
FIG. 10 is a schematic diagram of a frame from an AR/VR environment, in accordance with implementations as described herein.

FIG. 10 is a schematic diagram of a frame 1000 that continues the example selection process of FIGS. 8 and 9, according to some implementations. The frame 1000 shows the 3D environment 802, which includes the plurality of entities 804. Also shown in the frame 1000 is a selection volume 1002 and a virtual controller 1004. In some implementations, the selection volume 1002 is formed by continuing to sweep a selection region, such as the selection region 806, through the 3D environment 802 after forming the selection volume 902 (shown in FIG. 9). As described above, the sweeping can be controlled by a user moving and/or rotating a handheld controller to define a selection path. In FIG. 10, the handheld controller is represented in the 3D environment 802 by the virtual controller 1004 that is shown to move and/or rotate according to the user's movements and/or rotations of the physical controller.

Figure 11:
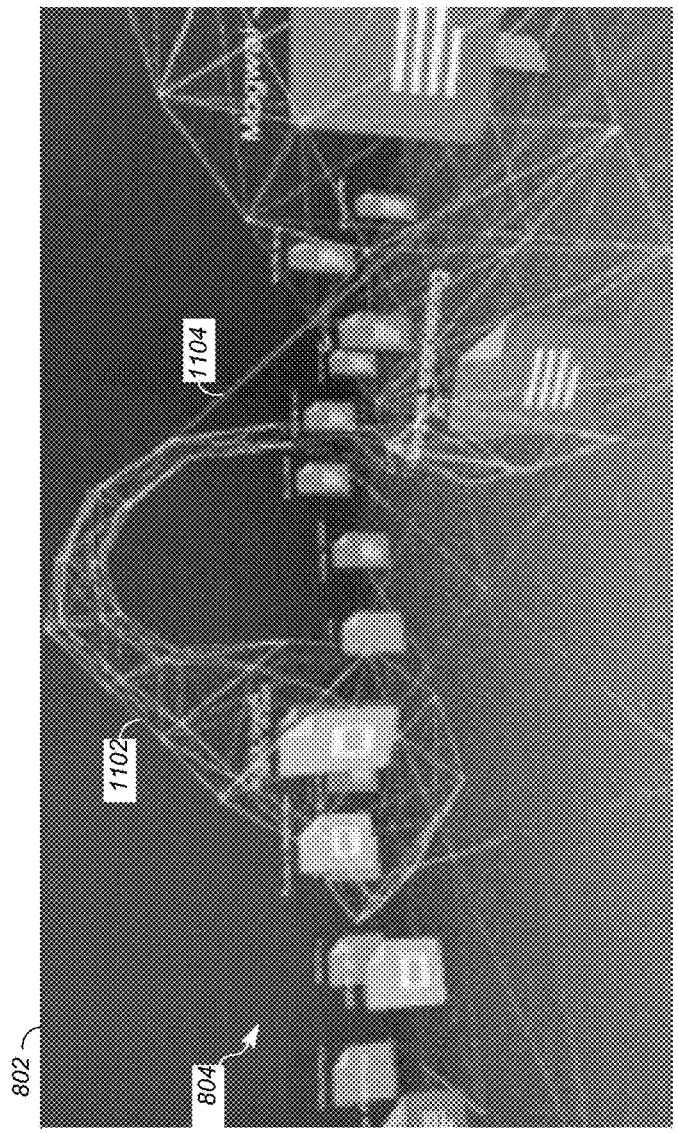
FIG. 11 is a schematic diagram of a frame from an AR/VR environment, in accordance with implementations as described herein.

FIG. 11 is a schematic diagram of a frame 1100 that continues the example selection process of FIGS. 8-10, according to some implementations. The frame 1100 shows the 3D environment 802, which includes the plurality of entities 804. Also shown in the frame 1100 is a selection volume 1102. As described above, a selection volume can be formed by sweeping a selection region, such as the selection region 806, through the 3D environment 802. In FIG. 11, the user has completed the selection process, which may be indicated by actuating or releasing a user-actuatable control of a handheld controller. FIG. 11 also shows a pointer 1104 that can, for example, be controlled by aiming the handheld controller. In this example, the user has pointed the pointer 1104 at the selection volume 1102. In some implementations, the user can click-and-drag the selection volume 1102 to, for example, move the entities from the plurality of entities 804 that are selected by the selection volume 1102. The click-and-drag type movement can be accomplished by aiming the handheld controller at the selection volume, actuating a user-actuatable control, aiming the handheld controller elsewhere, and then releasing the user-actuatable control. In some implementations, an entity is selected when any part of the object is within the selection volume. Alternatively, an entity can be determined to be selected when either a majority or the entirety of the entity is within the selection volume.

Figure 12:
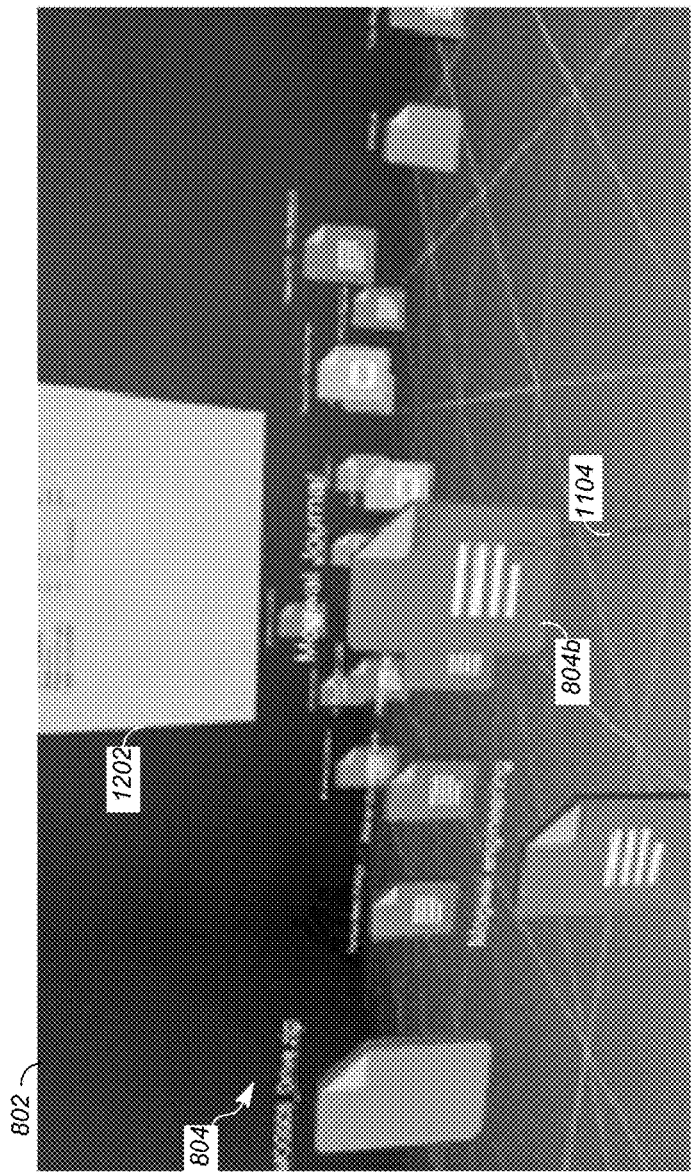
FIG. 12 is a schematic diagram of a frame from an AR/VR environment, in accordance with implementations as described herein.

FIG. 12 is a schematic diagram of a frame 1200 that shows an example process of interacting with an entity in a 3D environment, according to some implementations. The frame 1200 shows the 3D environment 802, which includes the plurality of entities 804. The frame 1200 also includes the pointer 1104. In this example, the pointer 1104 is aimed at the entity 804*b*. In response, a visual entity 1202 is shown. The visual entity 1202 includes information about the entity 804*b*. For example, the visual entity 1202 could include a preview of a document associated with the entity 804*b*. In some implementations, visual entities, such as the visual entity 1202, are shown whenever the pointer 1104 intersects an object. Alternatively, the visual entity 1202 may be shown responsive to actuation of a user-actuatable control on the handheld controller (e.g., such as pulling a trigger button on the handheld control).

In some implementations, a user can place one or more flags in the 3D environment. The flags can have various properties, such as a color or size. The flags can serve as visual indicators that are usable to locate certain of the entities from the plurality of entities 804. The flags can also be used as an organizational tool for the plurality of entities 804. For example, the flags can define a region in which a subset of the entities that have a certain property are placed.

As described above, the entities can be associated with various different types of entities. In some implementations, the entities represent files in a file system. Various visual properties of the entities may correspond to properties of the corresponding file. For example, the color of the object may correspond to the file type, and the size (or height) of the object may correspond to the size of the file.

Figure 13:
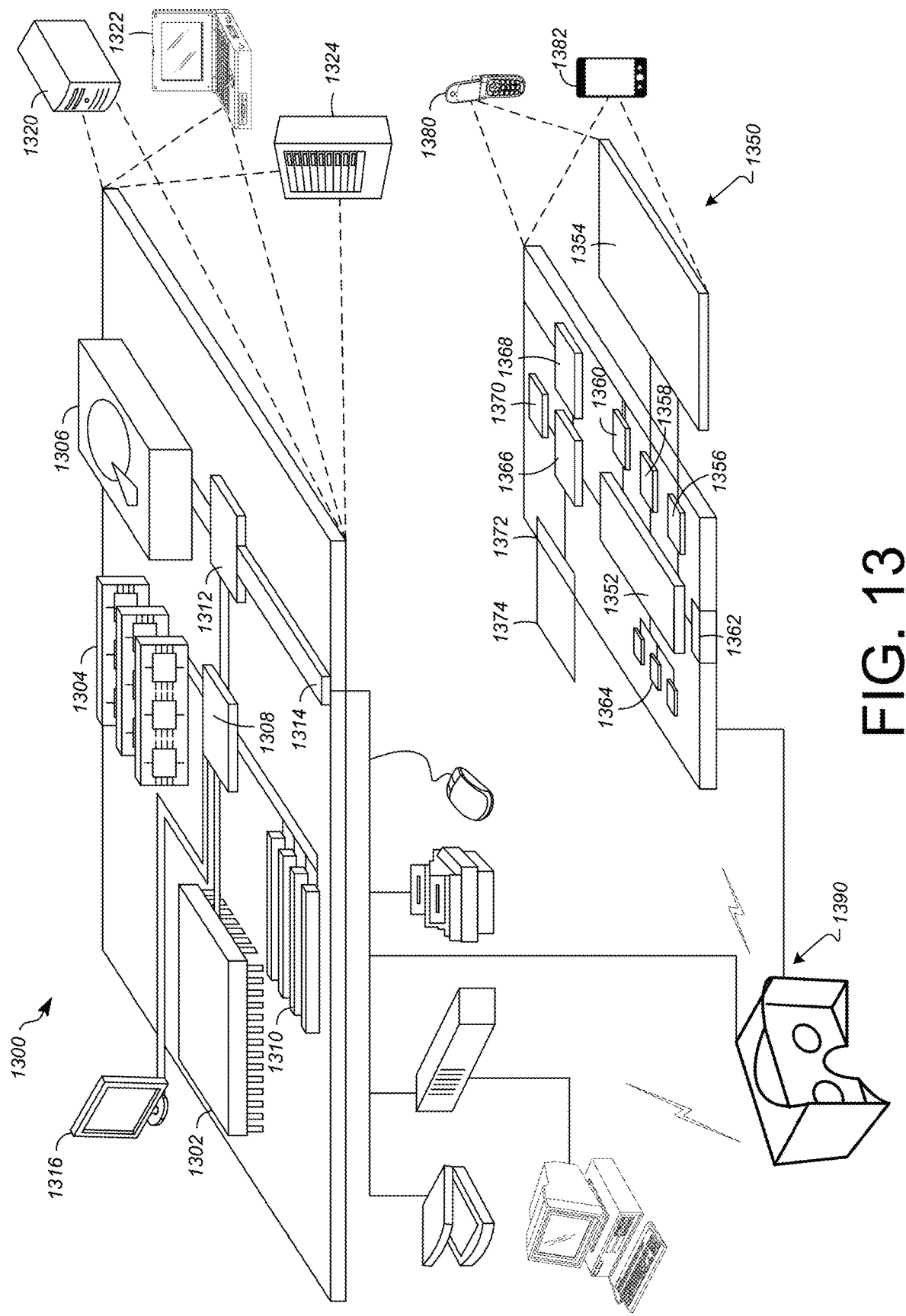
FIG. 13 shows an example of a computing device and a mobile computing device that can be used to implement the techniques described herein.

FIG. 13 shows an example of a computer device 1300 and a mobile computer device 1350, which may be used with the techniques described here. Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a BLUETOOTH, Wi-Fi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smartphone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 13 can include sensors that interface with a virtual reality (VR headset/HMD device 1390). For example, one or more sensors included on a computing device 1350 or other computing device depicted in FIG. 13, can provide input to VR headset 1390 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1350 can use the sensors to determine an absolute position and/or a detected rotation of the computing device in the VR space that can then be used as input to the VR space. For example, the computing device 1350 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1350 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1350 when the computing device is incorporated into the VR space can cause a particular action to occur in the VR space.

In some implementations, a touchscreen of the computing device 1350 can be rendered as a touchpad in VR space. A user can interact with the touchscreen of the computing device 1350. The interactions are rendered, in VR headset 1390 for example, as movements on the rendered touchpad in the VR space. The rendered movements can control virtual entities in the VR space.

In some implementations, one or more output devices included on the computing device 1350 can provide output and/or feedback to a user of the VR headset 1390 in the VR space. The output and feedback can be visual, tactile, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1350 may appear as another object in a computer-generated, 3D environment. Interactions by the user with the computing device 1350 (e.g., rotating, shaking, touching a touchscreen, swiping a finger across a touch screen) can be interpreted as interactions with the object in the VR space. In the example of the laser pointer in a VR space, the computing device 1350 appears as a virtual laser pointer in the computer-generated, 3D environment. As the user manipulates the computing device 1350, the user in the VR space sees movement of the laser pointer. The user receives feedback from interactions with the computing device 1350 in the VR environment on the computing device 1350 or on the VR headset 1390.

In some implementations, a computing device 1350 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control entities in the VR space.

Computing device 1300 is intended to represent various forms of digital computers and devices, including, but not limited to laptops, desktops, workstations, personal digital assistants, servers, blade servers, mainframes, and other appropriate computers. Computing device 1350 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

In the following several examples are described.

Example 1

A computer-implemented method comprising: generating a selection region within a three-dimensional (3D) space; receiving a selection path user input to define a selection path; defining a selection volume based on the selection region and the selection path; and selecting entities within the 3D space based on the selection volume.

Example 2

The computer-implemented method of example 1, wherein the receiving the selection path user input includes: receiving a sequence of positional user inputs; and mapping the positional user inputs to a sequence of 3D coordinates in the 3D space.

Example 3

The computer-implemented method of example 2, wherein the receiving a sequence of positional user inputs includes detecting a sequence of contact points on a touchscreen.

Example 4

The computer-implemented method of example 2 or 3, wherein the receiving a sequence of positional user inputs includes detecting positional changes of a hand-held device using an inertial motion unit.

Example 5

The computer-implemented method of at least one of the examples 2 to 4, wherein the receiving a sequence of positional user inputs includes detecting positional changes of a hand-held device using a visual positioning system.

Example 6

The computer-implemented method of at least one of the examples 2 to 5, wherein the receiving a sequence of positional user inputs includes: capturing images of a body part; and determining a sequence of positional changes of the body part based on the captured images.

Example 7

The computer-implemented method of one of the preceding examples, further comprising altering the selection region while receiving the selection path user input.

Example 8

The computer-implemented method of example 7, wherein the altering the selection region includes: receiving an alter selection region user input; and responsive to receiving the alter selection region user input, altering the selection region.

Example 9

The computer-implemented method of example 7 or 8, wherein the altering the selection region includes altering a shape of the selection region.

Example 10

The computer-implemented method of at least one of the preceding examples, wherein the selection volume and the selection path are generated in a single gesture.

Example 11

The computer-implemented method of at least one of the preceding examples, wherein the selection volume is generated by sweeping the selection region along the received selection path.

Example 12

The computer-implemented method of at least one of the preceding examples, wherein a selection volume generation engine generates contextual selection region shapes that are selectable based on the types of files that are proximate to the portion of the selection path.

Example 13

The computer-implemented method of at least one of the preceding examples, wherein an entity selection engine selects any entities that at least partially intersect with the selection volume or only entities that are fully contained within the selection volume are selected.

Example 14

A computing device comprising: at least one processor; and memory storing instructions that, when executed by the at least one processor, cause the computing device to: generate a selection polygon within a 3D space; receive a selection path user input to define a selection path; define a selection volume based on the selection polygon and the selection path; and select entities within the 3D space based on the selection volume.

Example 15

The computing device of example 14, wherein the instructions that cause the computing device to define the selection volume include instructions that cause the computing device to sweep the selection polygon along the selection path to define the selection volume.

Example 16

The computing device of example 14 or 15, wherein the instructions that cause the computing device to sweep the selection polygon along the selection path include instructions that cause the computing device to: move the selection polygon along the selection path; and orient the selection polygon based on the selection path.

Example 17

The computing device of at least one of examples 14 to 16, wherein the selection polygon is a planar polygon and the instructions that cause the computing device to orient the selection polygon include instructions that cause the computing device to orient the selection polygon so that a normal direction to the selection polygon is parallel with a direction of the selection path.

Example 18

The computing device of at least one of the examples 14 to 17, wherein the 3D space is a virtual reality environment.

Example 19

The computing device of at least one of the examples 14 to 18, wherein the 3D space is an augmented reality environment in which a computer-generated entity is overlaid on a view of physical environment surrounding a user.

Example 20

The computing device of at least one of the examples 14 to 19, wherein the selection volume and the selection path are generatable in a single gesture.

Example 21

The computing device of at least one of the examples 14 to 21, wherein with a selection volume generation engine contextual selection region shapes are generatable that are selectable based on the types of files that are proximate to the portion of the selection path.

Example 22

The computing device of at least one of the examples 14 to 22, wherein with an entity selection engine any entities that at least partially intersect with the selection volume are selectable or only entities selectable that are fully contained within the selection volume.

Example 23

A computer-implemented method comprising: generating a selection polygon within a 3D space; receiving a first selection path user input to define a first portion of a selection path; receiving an alter selection polygon user input; responsive to receiving the alter selection polygon user input, altering the selection polygon; receiving a second selection path user input to define a second portion of the selection path; defining a selection volume based on the selection polygon and the selection path; and selecting entities within the 3D space based on the selection volume.

Example 24

The computer-implemented method of example 23, wherein the altering the selection polygon includes altering a shape of the selection polygon.

Example 25

The computer-implemented method of example 23 or 24, wherein altering the shape of the selection polygon includes: generating a contextual shape suggestion based on the selection path; and applying the contextual shape suggestion to alter the shape of the selection polygon.

Example 26

The computer-implemented method of at least one of the examples 23 to 25, where in the generating the contextual shape suggestion includes: identifying a portion of the 3D space based on a current direction and position of the selection path; identifying entities in the portion of the 3D space; and using the identified entities to generate a contextual shape suggestion.

Example 27

The computer-implemented method of at least one of the examples 23 to 26, wherein the altering the selection polygon includes altering a size of the selection polygon.

Example 28

The computer-implemented method of at least one of the examples 23 to 27, wherein the selecting entities within the 3D space based on the selection volume includes: identifying entities in the 3D space that at least partially intersect the selection volume.

Example 29

The computer-implemented method of at least one of the examples 23 to 28, wherein the selecting entities within the 3D space based on the selection volume includes: estimating a user precision factor; determining a selection radius based on the user precision factor; and selecting entities within the selection radius of the selection volume.

Example 30

The computer-implemented method of at least one of the examples 23 to 29, wherein the selection volume and the selection path are generatable in a single gesture.

Example 31

The computer-implemented method at least one of the examples 23 to 30, wherein with an entity selection engine any entities that at least partially intersect with the selection volume are selectable or only entities selectable that are fully contained within the selection volume.

Example 32

The computer-implemented method at least one of the examples 23 to 31, wherein the entities include file entities associated with files stored in a file system and the selecting entities within the 3D space based on the selection volume includes selecting only file entities of a specific file type.

Example 33

The computer-implemented method at least one of the examples 23 to 32, wherein the entities include flags that are associated with multiple other entities and the selecting entities within the 3D space based on the selection volume includes: selecting a flag that intersects with the selection volume; and based on the selecting the flag, selecting additional entities that are associated with the flag, wherein the additional entities do not intersect with the selection volume.

Example 34

The computer-implemented method at least one of the examples 23 to 33, further comprising: projecting a pointer into the 3D space based on a user input; identifying an entity based on the pointer; and triggering display of a preview associated with the entity.

What is claimed is:
1. A computer-implemented method comprising:
generating a selection region defined as a two-dimensional (2D) plane within a three-dimensional (3D) space;
receiving a selection path user input to define a selection path;
moving the selection region along the selection path to define a selection volume; and
selecting entities within the 3D space based on the selection volume.
2. The computer-implemented method of claim 1, wherein the receiving the selection path user input includes:
receiving a sequence of positional user inputs; and
mapping the positional user inputs to a sequence of 3D coordinates in the 3D space.
3. The computer-implemented method of claim 2, wherein the receiving a sequence of positional user inputs includes detecting a sequence of contact points on a touchscreen.
4. The computer-implemented method of claim 2, wherein the receiving a sequence of positional user inputs includes detecting positional changes of a hand-held device using an inertial motion unit.
5. The computer-implemented method of claim 2, wherein the receiving a sequence of positional user inputs includes detecting positional changes of a hand-held device using a visual positioning system.
6. The computer-implemented method of claim 2, wherein the receiving a sequence of positional user inputs includes:
capturing images of a body part; and
determining a sequence of positional changes of the body part based on the captured images.
7. The computer-implemented method of claim 1, further comprising altering the selection region while receiving the selection path user input.
8. The computer-implemented method of claim 7, wherein the altering the selection region includes:
receiving an alter selection region user input; and
responsive to receiving the alter selection region user input, altering the selection region.
9. The computer-implemented method of claim 8, wherein the altering the selection region includes altering a shape of the selection region.
10. A computing device comprising:
at least one processor; and
memory storing instructions that, when executed by the at least one processor, cause the computing device to:
generate a selection polygon within a 3D space;
receive a selection path user input to define a selection path;
move the selection polygon along the selection path to define a selection volume that increases in volume with the movement of the selection polygon along the selection path; and
select entities within the 3D space based on the selection volume.
11. The computing device of claim 10, wherein the instructions that cause the computing device to move the selection polygon along the selection path include instructions that cause the computing device to: orient the selection polygon based on the selection path.
12. The computing device of claim 11, wherein the selection polygon is a planar polygon and the instructions that cause the computing device to orient the selection polygon include instructions that cause the computing device to orient the selection polygon so that a normal direction to the selection polygon is parallel with a direction of the selection path.
13. The computing device of claim 10, wherein the 3D space is a virtual reality environment.
14. The computing device of claim 10, wherein the 3D space is an augmented reality environment in which a computer-generated entity is overlaid on a view of physical environment surrounding a user.
15. A computer-implemented method comprising:
generating a selection polygon within a 3D space, the selection polygon having a first shape;
receiving a first selection path user input to define a first portion of a selection path;
receiving an alter selection polygon user input;
responsive to receiving the alter selection polygon user input, altering the selection polygon, the altered selection polygon having a second shape different than the first shape;

receiving a second selection path user input to define a second portion of the selection path;

defining a selection volume based on the selection polygon and the selection path; and selecting entities within the 3D space based on the selection volume.

16. The computer-implemented method of claim 15, wherein altering the shape of the selection polygon includes:

generating a contextual shape suggestion based on the selection path; and applying the contextual shape suggestion to alter the shape of the selection polygon.

17. The computer-implemented method of claim 16, where in the generating the contextual shape suggestion includes:

identifying a portion of the 3D space based on a current direction and position of the selection path;

identifying entities in the portion of the 3D space; and using the identified entities to generate a contextual shape suggestion.

18. The computer-implemented method of claim 15, wherein the altering the selection polygon includes altering a size of the selection polygon.

19. The computer-implemented method of claim 15, wherein the selecting entities within the 3D space based on the selection volume includes:

identifying entities in the 3D space that at least partially intersect the selection volume.

20. The computer-implemented method of claim 15, wherein the selecting entities within the 3D space based on the selection volume includes:

estimating a user precision factor;

determining a selection radius based on the user precision factor; and selecting entities within the selection radius of the selection volume.

* * * * *